United States Patent
Zhu et al.

(10) Patent No.: US 11,753,005 B2
(45) Date of Patent: Sep. 12, 2023

(54) COLLISION DETECTION METHOD, AND DEVICE, AS WELL AS ELECTRONIC DEVICE AND STORAGE MEDIUM

(71) Applicant: Baidu International Technology (Shenzhen) Co., Ltd., Guangdong Province (CN)

(72) Inventors: Xiaoxing Zhu, Guangdong Province (CN); Chengfa Wang, Guangdong Province (CN); Yongyi Sun, Guangdong Province (CN)

(73) Assignee: Baidu International Technology (Shenzhen) Co., Ltd., Shenzhen (CN)

( * ) Notice: Subject to any disclaimer, the term of this patent is extended or adjusted under 35 U.S.C. 154(b) by 550 days.

(21) Appl. No.: 16/920,411

(22) Filed: Jul. 2, 2020

(65) Prior Publication Data

US 2021/0188263 A1    Jun. 24, 2021

(30) Foreign Application Priority Data

Dec. 23, 2019   (CN) .......................... 201911335616.3

(51) Int. Cl.
*B60W 30/095*   (2012.01)
*B60W 30/09*    (2012.01)
*B60W 60/00*    (2020.01)

(52) U.S. Cl.
CPC ........ *B60W 30/0953* (2013.01); *B60W 30/09* (2013.01); *B60W 30/0956* (2013.01);
(Continued)

(58) Field of Classification Search
CPC ............ B60W 30/09; B60W 30/0953; B60W 30/0956; B60W 60/0027; B60W 60/00272; G06V 20/58
See application file for complete search history.

(56) References Cited

U.S. PATENT DOCUMENTS 9,760,806 B1     9/2017 Ning et al.
2017/0344855 A1* 11/2017 Mande ................. G08G 1/0962
(Continued)

FOREIGN PATENT DOCUMENTS

CN    107305740 A    10/2017
CN    107368890 A    11/2017
(Continued)

OTHER PUBLICATIONS

Japanese Patent Office, Reasons for Refusal, mailed in relationship to Japanese Application No. 2020-104948, dated Jul. 6, 2021 (10 pages).
(Continued)

*Primary Examiner* — Anshul Sood
(74) *Attorney, Agent, or Firm* — Banner & Witcoff, Ltd.

(57) ABSTRACT

A collision detection method and device, as well as an electronic device and a storage medium are provided. The collision detection method includes: acquiring a plurality of video frames containing an obstacle target within a preset time period; analyzing the plurality of video frames to acquire a historical moving track of the obstacle target within the preset time period; inputting the historical moving track into a pre-trained track prediction model, to acquire at least one predicted moving track of the obstacle target; and performing a collision detection with a planned track of an autonomous vehicle and the at least one predicted moving track. The accuracy of collision detection can be improved.

20 Claims, 4 Drawing Sheets

(52) U.S. Cl.
CPC .. *B60W 60/0027* (2020.02); *B60W 60/00272* (2020.02); *B60W 2520/06* (2013.01); *B60W 2520/10* (2013.01); *B60W 2554/80* (2020.02)

(56) References Cited

U.S. PATENT DOCUMENTS

| | | | |
|---|---|---|---|
| 2019/0367020 | A1 | 12/2019 | Yan et al. |
| 2020/0189573 | A1* | 6/2020 | King ................. B60W 30/0956 |
| 2022/0383585 | A1* | 12/2022 | Lee ....................... G06T 11/006 |

FOREIGN PATENT DOCUMENTS

| | | |
|---|---|---|
| CN | 107492113 A | 12/2017 |
| CN | 107757613 A | 3/2018 |
| CN | 108010388 A | 5/2018 |
| CN | 108859935 A | 11/2018 |
| CN | 109960261 A | 7/2019 |
| JP | 2005203939 A | 7/2005 |
| JP | 2010109452 A | 5/2010 |
| JP | 2016-192146 A | 11/2016 |
| JP | 2016192146 A | 11/2016 |
| JP | 2018-055141 A | 4/2018 |
| JP | 2018055141 A | 4/2018 |
| JP | 2018078449 A | 5/2018 |

OTHER PUBLICATIONS

European Patent Office, Extended European Search Report, issued for European Application No. 20184262.2, dated Nov. 17, 2020 (8 pages).

Khosroshahi, A. et al., "Surround Vehicles Trajectory Analysis with Recurrent Neural Networks," 2016 IEEE International Conference on Intelligent Transportation Systems (ITSC), Nov. 2016 (6 pages).

Hu, W. et al., "Traffic Accident Prediction Using Vehicle Tracking and Trajectory Analysis," 2003 IEEE International Conference on Intelligent Transportation Systems (ITSC), Nov. 2003 (6 pages).

Japanese Patent Office, Decision to Grant a Patent, issued in connection with JP Application No. 2020-104948, dated Feb. 16, 2022 (5 pages).

Mar. 16, 2023—(CN) First Office Action—App. No. 2019113356163, w/ translation—pp. 1-15.

Mar. 14, 2023—(CN) First Examination Report—App. No. 2019113356163, w/ translation—pp. 1-7.

* cited by examiner

COLLISION DETECTION METHOD, AND DEVICE, AS WELL AS ELECTRONIC DEVICE AND STORAGE MEDIUM

CROSS-REFERENCE TO RELATED APPLICATION

This application claims priority to Chinese Patent Application No. 201911335616.3, entitled "Collision Detection Method, and Device, as well as Electronic Device and Storage Medium", and filed on Dec. 23, 2019, which is hereby incorporated by reference in its entirety.

TECHNICAL FIELD

The present application relates to the field of autonomous driving. Particularly, it relates to a collision detection method and device, as well as an electronic device and a storage medium.

BACKGROUND

With the prevailing of automatic driving technology, more and more attention has been paid to a problem of moving track planning with an automatic driving vehicle as a research object. The obstacle avoidance path planning is a key part of autonomous vehicles, which is of great significance to the research of the autonomous vehicles. In the travelling process of the autonomous vehicle, it is a basic requirement to avoid obstacles accurately. A good collision detection and obstacle avoidance path planning algorithm can be used to avoid obstacles safely and in real time with a high taking comfort, thus improving a travel efficiency. At present, in traditional automatic driving, a geometric position overlapping, Kalman filter and other technologies are often used in the process of collision detection and obstacle avoidance. The disadvantages of these technologies are a low accuracy, which may lead to frequent sudden braking of a vehicle, and may affect passenger experience and road driving safety.

SUMMARY

A collision detection method and device, as well as an electronic device and a storage medium are provided according to an embodiment of the present application, so as to solve one or more technical problems in existing technologies.

In a first aspect, a collision detection method comprises:

acquiring a plurality of video frames containing an obstacle target within a preset time period;

analyzing the plurality of video frames to acquire a historical moving track of the obstacle target within the preset time period;

inputting the historical moving track into a pre-trained track prediction model, to acquire at least one predicted moving track of the obstacle target; and performing a collision detection with a planned track of an autonomous vehicle and the at least one predicted moving track.

In the embodiment of the application, through analyzing the video frames of the obstacle target, a historical moving track thereof is acquired, and predicting is performed according to the historical moving track to acquire the predicted moving track; according to the predicted moving track and the planned track of the automatic driving vehicle, a collision risk between the automatic driving vehicle and the obstacle target can be predicted, so as to improve the accuracy of collision detection.

In an embodiment, analyzing the plurality of video frames to acquire a historical moving track of the obstacle target within the preset time period, comprising:

converting each video frame into a three-dimensional image;

positioning a spatial position of the obstacle target in each video frame by using the three-dimensional images;

determining a moving speed and a moving direction of the obstacle target in each video frame by using the spatial position and an acquisition time of the video frame; and determining the historical moving track of the obstacle target in the preset time period based on the moving speed and the moving direction.

Since the video frame is converted into a three-dimensional image in advance, the spatial position of the obstacle target can be accurately located according to the three-dimensional image, thus the historical moving track can be accurately determined, and then the accuracy of track prediction can be improved, so as to achieve a purpose of improving the accuracy of collision detection.

In an embodiment, the pre-trained track prediction model is trained with a plurality of sample data, and the plurality of sample data is moving tracks of additional obstacle targets having an identical category with the obstacle target.

With the moving tracks of an identical category with the obstacle target as the training samples, the pre-trained track prediction model can be applied to the obstacle target, so as to acquire the predicted moving track of the obstacle target.

In an embodiment, performing a collision detection with a planned track of an autonomous vehicle and the at least one predicted moving track, comprises: determining that there is a collision risk, in a case that a shortest distance between the at least one predicted moving track and the planned track is less than a preset threshold; and the collision detection method further comprises: the collision detection method further comprises: modifying the planned track according to the at least one predicted moving track, in a case that the collision risk is determined.

In the embodiment of the application, at least one predicted moving track is used for collision detection and the planned track modification, rather than only one predicted moving track being used, so as to improve the driving safety of the automatic driving vehicle.

In an embodiment, modifying the planned track according to the at least one predicted moving track comprises:

determining a safety range according to the at least one predicted moving track, the safety range being a range connecting with a head position of the autonomous vehicle without an intersection with the at least one predicted moving track; and modifying the planned track within the safety range.

In the embodiment of the application, at least one predicted moving track is used to determine the safe range, which is convenient for modifying the planned path.

In a second aspect, a collision detection device is provided according to an embodiment of the application, comprising:

an acquiring module configured to acquire a plurality of video frames containing an obstacle target within a preset time period;

an analyzing module configured to analyze the plurality of video frames to acquire a historical moving track of the obstacle target within the preset time period;

a predicting module configured to input the historical moving track into a pre-trained track prediction model, to acquire at least one predicted moving track of the obstacle target; and a detecting module configured to perform a collision detection with a planned track of an autonomous vehicle and the at least one predicted moving track.

In an embodiment, the analyzing module comprises:

a converting unit configured to convert each video frame into a three-dimensional image;

a positioning unit configured to position a spatial position of the obstacle target in each video frame by using the three-dimensional images;

a moving feature determining unit configured to determine a moving speed and a moving direction of the obstacle target in each video frame by using the spatial position and an acquisition time of the video frame and;

a historical moving track determining unit configured to determine the historical moving track of the obstacle target in the preset time period based on the moving speed and the moving direction.

In an embodiment, the detecting module is configured to determine that there is a collision risk, in a case that a shortest distance between the at least one predicted moving track and the planned track is less than a preset threshold; and the collision detection device further comprises a modifying module configured to modify the planned track according to the at least one predicted moving track, in a case that the collision risk is determined.

In an embodiment, the modifying module comprises:

an excluding unit configured to determine a safety range according to the at least one predicted moving track, the safety range being a range connecting with a head position of the autonomous vehicle without an intersection with the at least one predicted moving track; and a modifying unit configured to modify the planned track within the safety range.

In a third aspect, an electronic device is provided according to an embodiment of the application, which comprises:

at least a processor; and a memory communicating connected to at least one processor; wherein, the memory stores instructions executable by least one processor, the instructions are executed by at least processor, so that at least one processor implement any of the method above.

In a fourth aspect, a non-transitory computer readable storage medium for storing computer instructions is provided according to an embodiment of the application, wherein the computer instructions are used to have the computer implement any of the above method.

One embodiment of the above application has the following advantages or beneficial effects. In an embodiment of the application, the historical moving track of the obstacle target is acquired through analyzing the video frames of the obstacle target, the moving track is predicted according to the historical moving track, and the predicted moving track is acquired; according to the predicted moving track and the planning track of the automatic driving vehicle, the collision risk between the automatic driving vehicle and the obstacle target can be predicted, so that the accuracy of collision detection can be improved.

Other effects of the above alternatives will be described below in combination with specific embodiments.

BRIEF DESCRIPTION OF THE DRAWINGS

The drawings are used to better understand the scheme and do not constitute the limitation of the application, wherein.

DETAILED DESCRIPTION

The exemplary embodiments of the application will be described below in combination with drawings, including various details of the embodiments of the application to facilitate understanding, which should be considered as exemplary only. Therefore, those of ordinary skill in the art should realize that various changes and modifications can be made to the embodiments described herein without departing from the scope and spirit of the present application. Similarly, for clarity and simplicity, the following description omits the description of the public function and structure.

An application scenario of the application is that in the process of automatic driving vehicle control, the video frames of the obstacle target entering the camera range of the automatic driving vehicle are acquired, and the historical moving track is acquired by analyzing the video frames; the potential moving track in the future is predicted with the historical moving track, and then an avoidance strategy is generated according to the predicted moving track. Of course, the practical applications of the application are not limited to the field of automatic driving vehicle control, but also can be applied to any scene where a collision may occur and collision avoidance is required.

Figure 1:
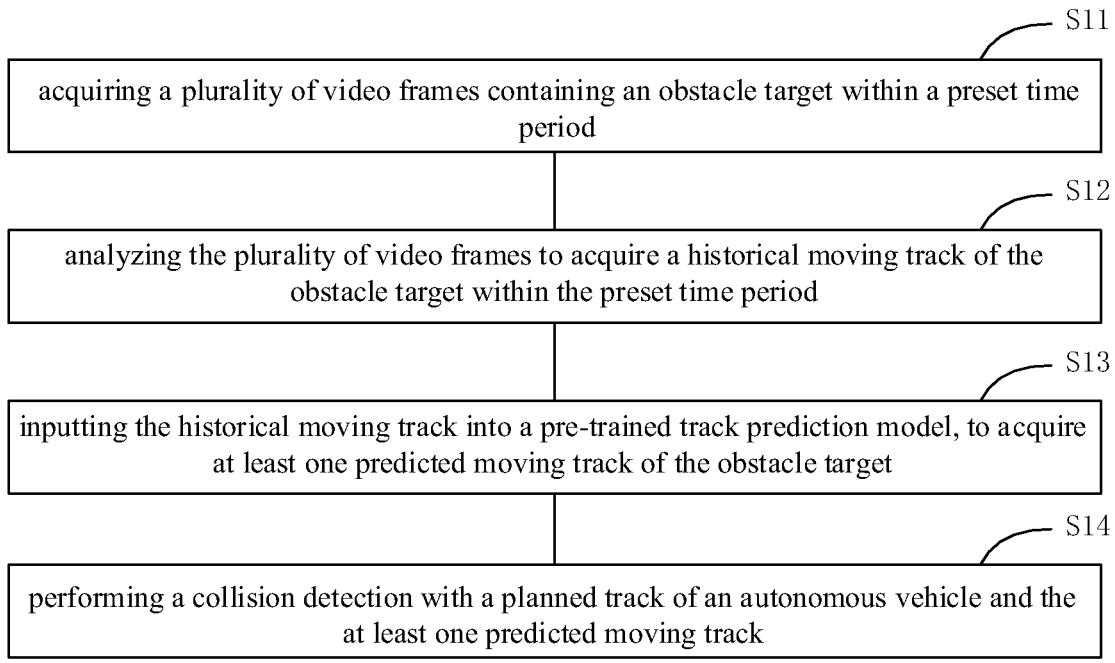
FIG. 1 shows a flow chart of a collision detection method according to an embodiment of the application.

FIG. 1 shows a flow chart of a collision detection method according to an embodiment of the application. As shown in FIG. 1, the collision detection method includes the following steps.

S11: acquiring a plurality of video frames containing an obstacle target within a preset time period.

Specifically, an obstacle target can be any object that may collide with an autonomous vehicle, such as a pedestrian, a pet, a motor vehicle, a non-motor vehicle, etc.

While or after acquiring multiple video frames of the obstacle target, the following operations can also be performed. On one hand, the same frames in these video frames can be de duplicated, so as to reduce a computational complexity and improve a processing efficiency. On the other hand, for a lack of information in the video frames, especially a video frame involving a key part of the target, a repairing algorithm can be used to perform the repairing and the accuracy of calculation can be improved. For example, in some video frames, due to a too large moving speed of the pedestrian and a less high sensitivity of the video acquisition equipment, a video frame with a blurred image caused by the large moving speed may be generated. At this time, the video frame can be repaired in combination with several video frames with a time sequence near the video frame, so as to more clearly and accurately present the profile of the obstacle target, which can supply a foundation for the path prediction of the pedestrian later.

S12: analyzing the plurality of video frames to acquire a historical moving track of the obstacle target within the preset time period.

Specifically, due to the timing relationship of multiple video frames, the obstacle target is in a sequence group of multiple video frames. With the spatial positions of the obstacle target in each video frame, combined with the acquisition time of each video frame, the historical moving track of the obstacle target can be calculated.

Furthermore, the historical moving track not only includes the path information during the moving process of the obstacle target, but also includes a moving speed, a moving direction and other moving information. Moreover, the moving speed includes not only basic moving data such as a moving speed and an acceleration, but also statistical speeds such as an average speed, a maximum speed and a minimum speed. The moving direction includes not only a moving angle, but also angle change parameters such as an angular speed, an angular acceleration and an angular displacement.

In an embodiment of the application, before analyzing the video frames, a video frame with a recognition error can be removed according to natural laws at first. For example, if the physical position of an obstacle target changes greatly, which does not conform to the natural laws, the video frame containing the obstacle target is an error video frame, which can be removed.

In an embodiment of the application, for the calculated historical moving track of the obstacle target, error information can also be removed according to natural laws. For example, a walking speed of a pedestrian is normally about 3 m/s. If the calculated historical moving track of a pedestrian shows that the walking speed of the pedestrian is far more than 3 m/s, the historical moving track is considered as error information and can be removed.

S13: inputting the historical moving track into a pre-trained track prediction model, to acquire at least one predicted moving track of the obstacle target.

Specifically, the pre-trained track prediction model can be a machine learning model, such as a RNN (Recurrent Neural Network), preferably a LSTM (Long Short Term Memory) model. The long-term and short-term memory model is a special kind of time recurrent neural network, which is mainly to solve problems of gradient disappearance and gradient explosion in the process of a long-sequence training. Simply to say, LSTM can perform better in a longer sequence than RNN. Therefore, for the obstacle target track prediction, the accuracy of prediction can be improved by using LSTM.

Moreover, because the predicted moving track can be multiple different moving tracks according to the historical moving track of the obstacle target, the obstacle target may select one of these moving tracks to travel according to different probabilities. Therefore, at least one predicted moving track needs to be considered comprehensively, to avoid a collision between autonomous vehicle and obstacle target as much as possible.

In an embodiment, the pre-trained track prediction model is trained with a plurality of sample data and the plurality of sample data is moving tracks of additional obstacle targets having an identical category with the obstacle target.

Specifically, for the prediction model, the more training samples, the better the effect of training, and the higher the accuracy of subsequent prediction. Therefore, in the process of training the track prediction model, it is required to take multiple sample data for training.

In addition, when training the track prediction model, additional obstacle targets with an identical category with the obstacle target can be used for training. For example, pedestrians can be divided into the elderly, children and middle-aged people, and moving tracks of different categories of pedestrians can be used as sample data to train a corresponding track prediction model of this category of pedestrians. In an actual prediction process, if the obstacle target is the elderly, the track prediction model corresponding to the elderly is used for prediction. If the obstacle target is of another category of pedestrians, the corresponding track prediction model is used for prediction similarly, so as to improve the accuracy of prediction.

S14: performing a collision detection with a planned track of an autonomous vehicle and the at least one predicted moving track.

Specifically, in the process of collision detection, both the predicted moving track of the obstacle target and the planned track of the automatic driving vehicle should be considered. Only when there is no intersection between the two, a collision will not occur. Since there are multiple predicted moving tracks acquired from the training model, these predicted moving tracks each has a certain collision probability with the autonomous vehicle. Therefore, in an example, a statistical method can be used to select a part of the predicted moving tracks, so that a confidence of each of the selected predicted moving tracks is a maximum probability (for example, 99.9%). By comparing the planned tracks of autonomous vehicles with this part of predicted moving tracks, the collision detection is performed, so as to improve the efficiency of collision detection.

Figure 2:
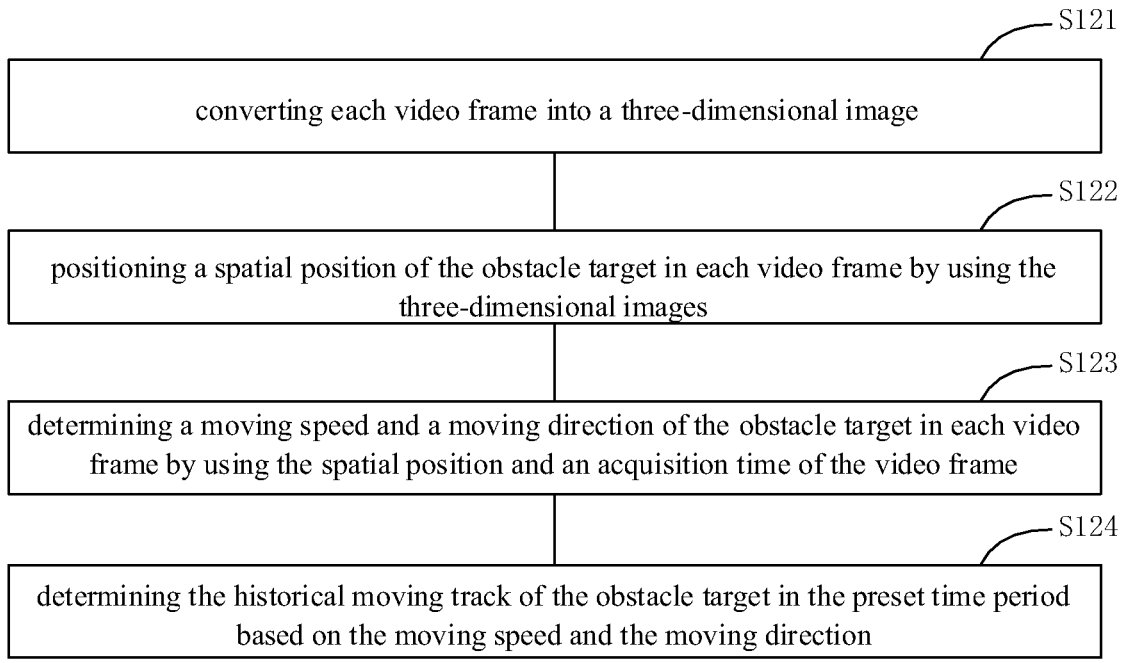
FIG. 2 shows a flow chart of a collision detection method according to an embodiment of the application.

FIG. 2 shows a flow chart of a collision detection method according to an embodiment of the application. As shown in FIG. 2, in an embodiment, the analyzing the plurality of video frames to acquire a historical moving track of the obstacle target within the preset time period comprises includes the following steps.

S121: converting each video frame into a three-dimensional image.

Specifically, each video frame can be considered as a two-dimensional image, which can be converted into a three-dimensional scene by a depth-map-based three dimensional effect synthesis technology, or an SFM (structure from motion) technology. The depth-map-based three dimensional effect synthesis technology is mainly divided into five steps: original image analysis, depth information extraction, depth map generation, new view synthesis and stereo view synthesis. In the SFM technology, the internal and external parameters of the moving camera in a three-dimensional scene and the structure relationship of this scene relative to a reference coordinate system are estimated by matching points in an image set.

S122: positioning a spatial position of the obstacle target in each video frame by using the three-dimensional images.

Specifically, by positioning the spatial position of the obstacle target in each video frame, more accurate analysis and infer for a moving intention of the pedestrian can be performed. For example, a speed and a direction of the pedestrian trunk can be obtained from the three-dimensional image converted from historical frame data of the pedestrian, so as to avoid the interference of s arm swinging and leg swinging of the pedestrian.

S123: determining a moving speed and a moving direction of the obstacle target in each video frame by using the spatial position and an acquisition time of the video frame.

Specifically, through the spatial position of obstacle target in each acquisition time, the moving speed and the moving direction of obstacle target can be calculated by a kinematic method. Similarly, in order to predict the moving track more accurately, it is also possible to calculate statistical speeds such as the average speed, the maximum speed, the minimum speed, and the like, as well as angular change parameters such as the angular velocity, the angular acceleration, and the angular displacement.

S124: determining the historical moving track of the obstacle target in the preset time period based on the moving speed and the moving direction.

Specifically, by fitting the positions of the obstacle target in a predetermined period of time, the historical moving track of the obstacle target in that period of time can be obtained.

Figure 3:
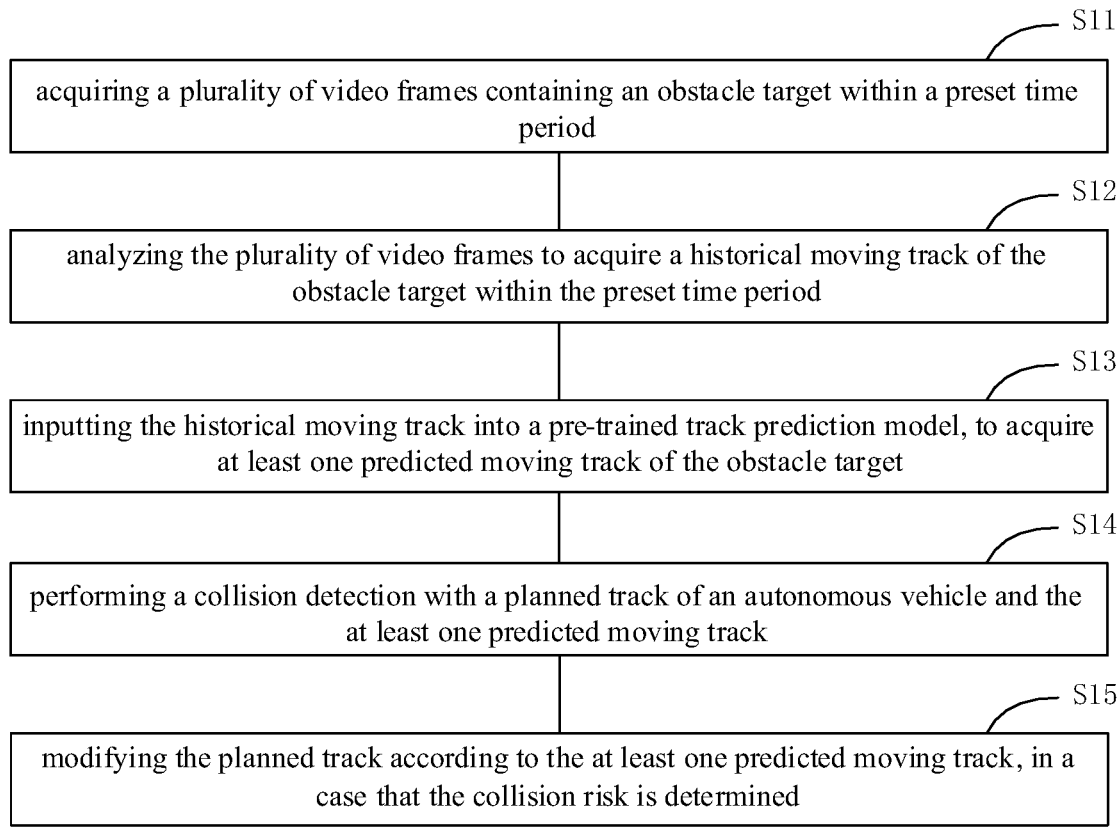
FIG. 3 shows a flow chart of a collision detection method according to an embodiment of the application.

FIG. 3 shows a flow chart of a collision detection method according to an embodiment of the application. As shown in FIG. 3, in an embodiment, S14 includes:

determining that there is a collision risk, in a case that a shortest distance between the at least one predicted moving track and the planned track is less than a preset threshold.

The method further includes:

S15: modifying the planned track according to the at least one predicted moving track, in a case that the collision risk is determined.

In an embodiment, modifying the planned track according to at least one predicted moving track includes the following steps.

determining a safety range according to the at least one predicted moving track, the safety range being a range connecting with a head position of the autonomous vehicle without an intersection with the at least one predicted moving track; and modifying the planned track within the safety range.

In an example, with multiple predicted prediction tracks, a forbidden area can be formed by these prediction tracks in a form of superposition. On the road, the safe area can be obtained by excluding the forbidden area and the area prohibited by traffic rules (for example, road blocking, a reverse lane, a construction area, etc.). It is noted that the shape of the forbidden area changes with time, and at each time point, different shapes and positions are generated with the change of a moving speed and a moving direction of the target. When generating the avoidance strategy, avoidance needs be made according to the shape and position of the forbidden area.

Figure 4:
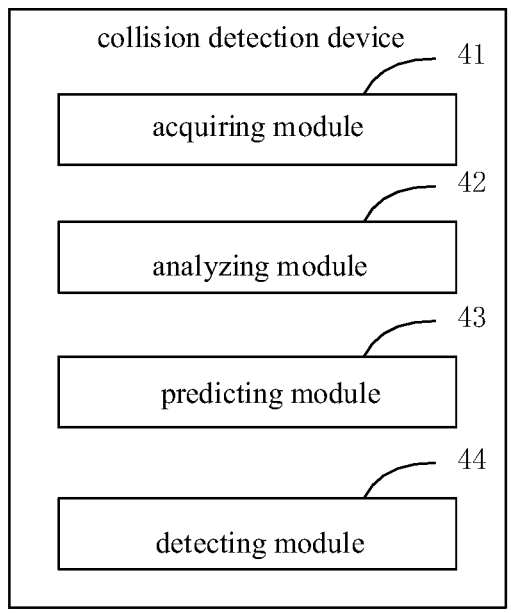
FIG. 4 shows a block diagram of a collision detection device according to an embodiment of the application.

FIG. 4 shows a block diagram of a collision detection device according to an embodiment of the application. As shown in FIG. 4, the collision detection device comprises:

an acquiring module 41 configured to acquire a plurality of video frames containing an obstacle target within a preset time period;

an analyzing module 42 configured to analyze the plurality of video frames to acquire a historical moving track of the obstacle target within the preset time period;

a predicting module 43 configured to input the historical moving track into a pre-trained track prediction model, to acquire at least one predicted moving track of the obstacle target; and a detecting module 44 configured to perform a collision detection with a planned track of an autonomous vehicle and the at least one predicted moving track.

Figure 5:
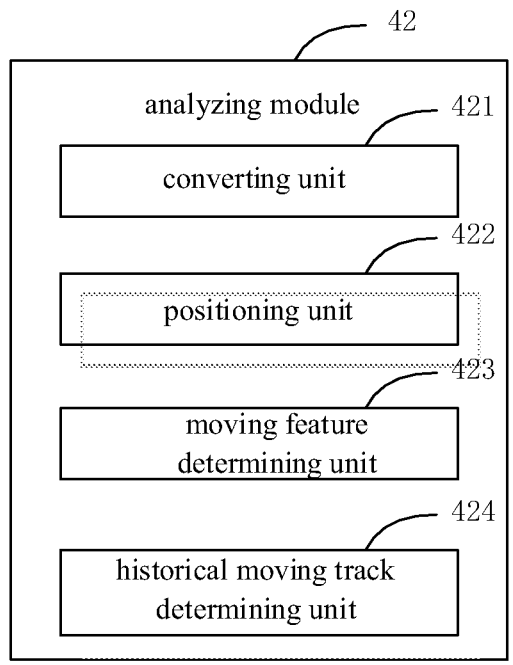
FIG. 5 shows a block diagram of an analyzing module according to an embodiment of the application.

FIG. 5 shows a block diagram of an analyzing module according to an embodiment of the application. As shown in FIG. 5, the analyzing module 42 comprises:

a converting unit 421 configured to convert each video frame into a three-dimensional image;

a positioning unit 422 configured to position a spatial position of the obstacle target in each video frame by using the three-dimensional images;

a moving feature determining unit 423 configured to determine a moving speed and a moving direction of the obstacle target in each video frame by using the spatial position and an acquisition time of the video frame; and a historical moving track determining unit 424 configured to determine the historical moving track of the obstacle target in the preset time period based on the moving speed and the moving direction.

Figure 6:
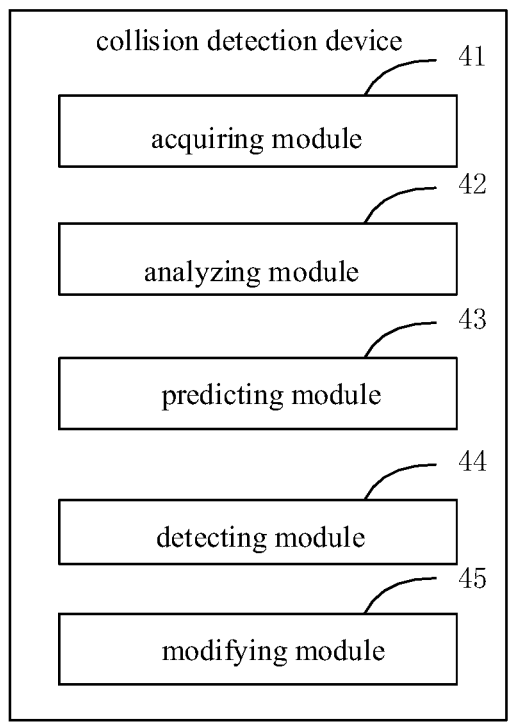
FIG. 6 shows a block diagram of a collision detection device according to an embodiment of the application.

FIG. 6 shows a block diagram of a collision detection device according to an embodiment of the application. As shown in FIG. 6, the detecting module 44 is configured to determine that there is a collision risk, in a case that a shortest distance between the at least one predicted moving track and the planned track is less than a preset threshold; and the collision detection device further comprises:

a modifying module 45 configured to modify the planned track according to the at least one predicted moving track, in a case that the collision risk is determined.

Figure 7:
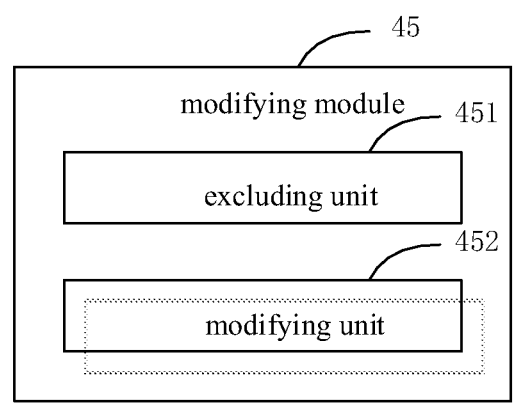
FIG. 7 shows a block diagram of a collision detection device according to an embodiment of the application.

FIG. 7 shows a block diagram of a collision detection device according to an embodiment of the application. As shown in FIG. 7, the modifying module 45 comprises:

an excluding unit 451 configured to determine a safety range according to the at least one predicted moving track, the safety range being a range connecting with a head position of the autonomous vehicle without an intersection with the at least one predicted moving track; and a modifying unit 452 configured to modify the planned track within the safety range.

The functions of each module in each device of the embodiment of the application can be referred to the corresponding description in the methods above, and will not be described here again.

According to an embodiment of the present application, the present application further provides an electronic device and a readable storage medium.

Figure 8:
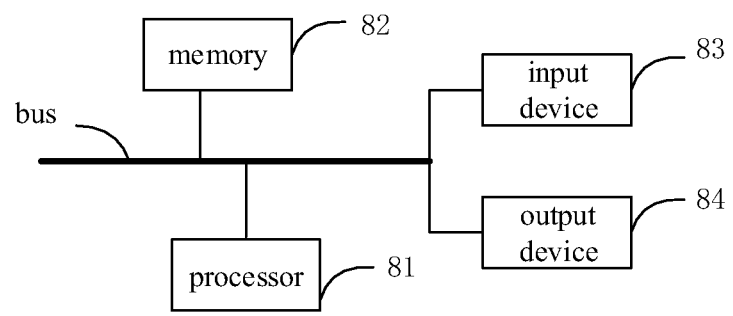
FIG. 8 shows a block diagram of an electronic device for collision detection according to an embodiment of the application.

As shown in FIG. 8, it is a block diagram of an electronic device according to a collision detection method according to an embodiment of the present application. Electronic devices are intended to represent various forms of digital computers, such as laptop computers, desktop computers, workbenches, personal digital assistants, servers, blade servers, mainframe computers, and other suitable computers. Electronic devices can also represent various forms of mobile devices, such as personal digital processing, cellular phones, smart phones, wearable devices, and other similar computing devices. The components shown here, their connections and relationships, and their functions are merely examples, and are not intended to limit the implementation of the application described and/or required herein.

As shown in FIG. 8, the electronic device includes: one or more processors 81, a memory 82, and interfaces for connecting various components, including a high-speed interface and a low-speed interface. The various components are interconnected with different buses and can be mounted on a public mainboard or otherwise installed as required. The processor can process instructions executed within the electronic device, including instructions storing in or on a memory to display a graphical user interface (GUI) on an external input/output device (such as a display device coupled to the interface). In other embodiments, multiple processors and/or multiple buses can be used with multiple memories and multiple memories, if desired. Similarly, multiple electronic devices can be connected, each providing some of the necessary operations (for example, as a server array, a group of blade servers, or a multiprocessor system). A processor 81 is taken as an example in FIG. 8.

The memory 82 is a non-transitory computer readable storage medium provided by the present application. The memory stores instructions executable by at least one processor, so that at least one processor executes the collision detection method provided in the present application. The non-transitory computer readable storage medium of the present application stores computer instructions, which are used to have a computer to implement a collision detection method provided by this application.

As a non-transitory computer readable storage medium, the memory 82 can be used to store non-transitory software programs, non-transitory computer executable programs, and modules, such as program instructions/modules corresponding to the collision detection method in the embodiments of the present application. The processor 81 executes various functional applications and data processing of the server by running non-transitory software programs, instructions, and modules stored in the memory 82, that is, a method for implementing collision detection in the embodiments of the foregoing method can be implemented.

The memory 82 can include a storage program area and a storage data area, where the storage program area can store an operating system and applications required for at least one function; the storage data area can store the data created according to the use of the electronic device of the collision detection method, etc., and the like. In addition, the memory 82 can include a high-speed random access memory, and can also include a non-transitory memory, such as at least one magnetic disk storage device, a flash memory device, or other non-transitory solid-state storage device. In some embodiments, the memory 82 can alternatively include a memory remotely set relative to the processor 81, and these remote memories can be connected to the electronic device for collision detection through a network. Examples of the above network include, but are not limited to, the Internet, an intranet, a local area network, a mobile communication network, and combinations thereof.

The electronic device of the collision detection method can further include an input device 83 and an output device 84. The processor 81, the memory 82, the input device 83, and the output device 84 can be connected through a bus or in other ways. In FIG. 8, the connection through the bus is taken as an example.

The input device 83 can receive inputted numeric or character information, and generate key signal inputs related to user settings and function control of the electronic device for collision detection, such as a touch screen, a keypad, a mouse, a trackpad, a touchpad, a pointing stick, one or multiple mouse buttons, trackballs, joysticks and other input devices. The output device 84 can include a display device, an auxiliary lighting device (for example, an LED), a haptic feedback device (for example, a vibration motor), and the like. The display device can include, but is not limited to, a liquid crystal display (Liquid Crystal Display, LCD), a light emitting diode (Light Emitting Diode, LED) display, and a plasma display. In some embodiments, the display device can be a touch screen.

Various implementations of the systems and technologies described herein can be implemented in digital electronic circuit systems, integrated circuit systems, application specific integrated circuits (ASICs), computer hardware, firmware, software, and/or combinations thereof. These various embodiments can include: implementation in one or more computer programs that are executable and/or interpreted on a programmable system including at least one programmable processor, which can be a dedicated or general-purpose programmable processor that can receive data and instructions from a storage system, at least one input device, and at least one output device, and transmit data and instructions to the storage system, at least one input device, and at least one output device.

These computing programs (also known as programs, software, software applications, or code) include machine instructions of a programmable processor and can be implemented using high-level procedures and/or object-oriented programming languages, and/or assembly/machine languages. As used herein, the terms "machine readable medium" and "computer readable medium" refer to any computer program product, device, and/or device used to provide machine instructions and/or data to a programmable processor (for example, magnetic disks, optical disks, memories, and programmable logic devices (PLDs)), include machine readable medium that receives machine instructions as machine-readable signals. The term "machine-readable signal" refers to any signal used to provide machine instructions and/or data to a programmable processor.

In order to provide interaction with the user, the systems and techniques described herein can be implemented on a computer that has a display device (for example, CRT (Cathode Ray Tube) or LCD (Liquid Crystal Display) monitor for displaying information to the user; and a keyboard and pointing device (for example, a mouse or trackball) through which the user can provide input to the computer. Other kinds of devices can also be used to provide interaction with the user; for example, the feedback provided to the user can be any form of sensory feedback (for example, visual feedback, auditory feedback, or haptic feedback); and can be in any form (including acoustic input, voice input, or tactile input) to receive input from the user.

The systems and technologies described herein can be implemented in a subscriber computer of a computing system including background components (for example, as a data server), or a computing system including middleware components (for example, an application server), or a computing system including front-end components (for example, a user computer with a graphical user interface or a web browser, through which the user can interact with the implementation of the systems and technologies described herein), or include such background components, middleware components, or any combination of front-end components. The components of the system may be interconnected by any form or medium of digital data communication (for example, a communication network). Examples of communication networks include: a local area network (LAN), a wide area network (WAN), and the Internet.

The computer system can include clients and servers. The client and server are generally remote from each other and typically interact through a communication network. The client-server relationship is generated by computer programs running on the respective computers and having a client-server relationship with each other.

According to the solution of the embodiments of the application, on one hand, with converting the video frame into a three-dimensional image, the moving track of the obstacle target is predicted, which effectively avoids the situation that the movement posture of the obstacle target is too large, resulting in the inaccurate prediction of the moving track; on the other hand, the safety range is determined by at least one predicted moving track, and the planned track is modified according to the safety range It effectively solves the technical problem that the obstacle target may have multiple moving tracks. Because of the use of video frame to three-dimensional image, and determining the safety range and other technical means, it overcomes the technical problems of low accuracy in traditional collision detection process.

It should be understood that the various forms of processes shown above can be used to reorder, add, or delete steps. For example, the steps described in this application can be executed in parallel, sequentially, or in different orders. As long as the desired results of the technical solutions disclosed in this application can be achieved, there is no limitation herein.

The specific embodiments above do not constitute a limitation on the protection scope of the present application. It should be understood by those skilled in the art that various modifications, combinations, sub-combinations and substitutions can be made according to design requirements and other factors. Any modification, equivalent replacement and improvement made within the spirit and principle of this application shall be included in the protection scope of this application.

What is claimed is:

1. A collision detection method, performed by a processor, wherein the processor is applied to an application scenario for an autonomous vehicle, the method comprises:
    acquiring, through a camera of the autonomous vehicle, a plurality of video frames containing an obstacle target within a preset time period, de-duplicating a same frame among the plurality of video frames, and repairing a lack of information in a video frame involving a key part of the obstacle target to obtain a profile of the obstacle target, wherein the obstacle target comprises at least one of a pedestrian, a pet, a motor vehicle, or a non-motor vehicle;
    analyzing the plurality of video frames to acquire a historical moving track of the obstacle target within the preset time period;
    inputting the historical moving track into a pre-trained track prediction model, to acquire at least one predicted moving track of the obstacle target; and
    performing a collision detection with a planned track of the autonomous vehicle and the at least one predicted moving track.

2. The collision detection method according to claim 1, wherein the analyzing the plurality of video frames to acquire a historical moving track of the obstacle target within the preset time period comprises:
    converting each video frame into a three-dimensional image;
    positioning a spatial position of the obstacle target by using the three-dimensional images, wherein the spatial position of the obstacle target comprises the spatial position of the obstacle target in a three-dimensional scene corresponding to each video frame;
    determining a moving speed and a moving direction of the obstacle target by using the spatial position and an acquisition time corresponding to each video frame; and
    determining the historical moving track of the obstacle target in the preset time period based on the moving speed and the moving direction.

3. The collision detection method according to claim 2, wherein the pre-trained track prediction model is trained with a plurality of sample data, and the plurality of sample data is moving tracks of additional obstacle targets having an identical category with the obstacle target.

4. The collision detection method according to claim 2, wherein the performing a collision detection with a planned track of an autonomous vehicle and the at least one predicted moving track comprises: determining that there is a collision risk, in a case that a shortest distance between the at least one predicted moving track and the planned track is less than a preset threshold; and
    the collision detection method further comprises: modifying the planned track according to the at least one predicted moving track, in a case that the collision risk is determined.

5. The collision detection method according to claim 1, wherein the pre-trained track prediction model is trained with a plurality of sample data, and the plurality of sample data is moving tracks of additional obstacle targets having an identical category with the obstacle target.

6. The collision detection method according to claim 1, wherein the performing a collision detection with a planned track of an autonomous vehicle and the at least one predicted moving track comprises: determining that there is a collision risk, in a case that a shortest distance between the at least one predicted moving track and the planned track is less than a preset threshold; and
    the collision detection method further comprises: modifying the planned track according to the at least one predicted moving track, in a case that the collision risk is determined.

7. The collision detection method according to claim 6, wherein modifying the planned track according to the at least one predicted moving track comprises:
    determining a safety range according to the at least one predicted moving track, the safety range being a range connecting with a head position of the autonomous vehicle without an intersection with the at least one predicted moving track; and
    modifying the planned track within the safety range.

8. A collision detection device, applied to an application scenario for an autonomous vehicle and comprising:
    one or more processors; and
    a storage device configured for storing one or more programs, wherein
    the one or more programs are executed by the one or more processors to enable the one or more processors to:
    acquire, through a camera of the autonomous vehicle, a plurality of video frames containing an obstacle target within a preset time period, de-duplicate a same frame among the plurality of video frames, and repair a lack of information in a video frame involving a key part of the obstacle target to obtain a profile of the obstacle target, wherein the obstacle target comprises at least one of a pedestrian, a pet, a motor vehicle, or a non-motor vehicle;

analyze the plurality of video frames to acquire a historical moving track of the obstacle target within the preset time period;
input the historical moving track into a pre-trained track prediction model, to acquire at least one predicted moving track of the obstacle target; and
perform a collision detection with a planned track of the autonomous vehicle and the at least one predicted moving track.

9. The collision detection device according to claim 8, wherein the one or more programs are executed by the one or more processors to enable the one or more processors further to:
convert each video frame into a three-dimensional image;
position a spatial position of the obstacle target by using the three-dimensional images, wherein the spatial position of the obstacle target comprises the spatial position of the obstacle target in a three-dimensional scene corresponding to each video frame;
determine a moving speed and a moving direction of the obstacle target in each video frame by using the spatial position and an acquisition time corresponding to each video frame; and
determine the historical moving track of the obstacle target in the preset time period based on the moving speed and the moving direction.

10. The collision detection device according to claim 9, wherein the one or more programs are executed by the one or more processors to enable the one or more processors further to:
determine that there is a collision risk, in a case that a shortest distance between the at least one predicted moving track and the planned track is less than a preset threshold; and
modify the planned track according to the at least one predicted moving track, in a case that the collision risk is determined.

11. The collision detection device according to claim 8, wherein the one or more programs are executed by the one or more processors to enable the one or more processors further to:
determine that there is a collision risk, in a case that a shortest distance between the at least one predicted moving track and the planned track is less than a preset threshold; and
modify the planned track according to the at least one predicted moving track, in a case that the collision risk is determined.

12. The collision detection device according to claim 11, wherein the one or more programs are executed by the one or more processors to enable the one or more processors further to:
determine a safety range according to the at least one predicted moving track, the safety range being a range connecting with a head position of the autonomous vehicle without an intersection with the at least one predicted moving track; and
modify the planned track within the safety range.

13. The collision detection device according to claim 8, wherein the pre-trained track prediction model is trained with a plurality of sample data, and the plurality of sample data is moving tracks of additional obstacle targets having an identical category with the obstacle target.

14. A non-transitory computer readable storage medium for storing computer instructions, wherein the computer instructions, when executed by a processor which is applied to an application scenario for an autonomous vehicle, cause the processor to perform operations comprising:
acquiring, through a camera of the autonomous vehicle, a plurality of video frames containing an obstacle target within a preset time period, de-duplicating a same frame among the plurality of video frames, and repairing a lack of information in a video frame involving a key part of the obstacle target to obtain a profile of the obstacle target, wherein the obstacle target comprises at least one of a pedestrian, a pet, a motor vehicle, or a non-motor vehicle;
analyzing the plurality of video frames to acquire a historical moving track of the obstacle target within the preset time period;
inputting the historical moving track into a pre-trained track prediction model, to acquire at least one predicted moving track of the obstacle target; and
performing a collision detection with a planned track of the autonomous vehicle and the at least one predicted moving track.

15. The non-transitory computer-readable storage medium of claim 14, wherein the computer instructions, when executed by the processor, cause the processor to perform further operations comprising:
converting each video frame into a three-dimensional image;
positioning a spatial position of the obstacle target by using the three-dimensional images, wherein the spatial position of the obstacle target comprises the spatial position of the obstacle target in a three-dimensional scene corresponding to each video frame;
determining a moving speed and a moving direction of the obstacle target by using the spatial position and an acquisition time corresponding to each video frame; and
determining the historical moving track of the obstacle target in the preset time period based on the moving speed and the moving direction.

16. The non-transitory computer-readable storage medium of claim 15, wherein the pre-trained track prediction model is trained with a plurality of sample data, and the plurality of sample data is moving tracks of additional obstacle targets having an identical category with the obstacle target.

17. The non-transitory computer-readable storage medium of claim 15, wherein the computer instructions, when executed by the processor, cause the processor to perform further operations comprising:
determining that there is a collision risk, in a case that a shortest distance between the at least one predicted moving track and the planned track is less than a preset threshold; and
modifying the planned track according to the at least one predicted moving track, in a case that the collision risk is determined.

18. The non-transitory computer-readable storage medium of claim 14, wherein the pre-trained track prediction model is trained with a plurality of sample data, and the plurality of sample data is moving tracks of additional obstacle targets having an identical category with the obstacle target.

19. The non-transitory computer-readable storage medium of claim 14, wherein the computer instructions, when executed by the processor, cause the processor to perform further operations comprising:

determining that there is a collision risk, in a case that a shortest distance between the at least one predicted moving track and the planned track is less than a preset threshold; and modifying the planned track according to the at least one predicted moving track, in a case that the collision risk is determined.

20. The non-transitory computer-readable storage medium of claim 19, wherein the computer instructions, when executed by the processor, cause the processor to perform further operations comprising:

determining a safety range according to the at least one predicted moving track, the safety range being a range connecting with a head position of the autonomous vehicle without an intersection with the at least one predicted moving track; and modifying the planned track within the safety range.

\* \* \* \* \*